(12) United States Patent
Baum et al.

(10) Patent No.: US 10,605,909 B2
(45) Date of Patent: Mar. 31, 2020

(54) DEVICE FOR IMPLEMENT LOCALIZATION ON AN AGRICULTURAL TRACTOR

(71) Applicant: Deere & Company, Moline, IL (US)

(72) Inventors: Bernd Baum, Dannstadt-Schauernheim (DE); Daniel W. Mairet, Bettendorf, IA (US); Florian Reinmuth, Sinsheim (DE)

(73) Assignee: DEERE & COMPANY, Moline, IL (US)

(*) Notice: Subject to any disclaimer, the term of this patent is extended or adjusted under 35 U.S.C. 154(b) by 192 days.

(21) Appl. No.: 15/443,545

(22) Filed: Feb. 27, 2017

(65) Prior Publication Data

US 2017/0269202 A1    Sep. 21, 2017

(30) Foreign Application Priority Data

Mar. 17, 2016  (DE) .................. 10 2016 204 467

(51) Int. Cl.
*G01S 13/76* (2006.01)
*A01B 59/00* (2006.01)
(Continued)

(52) U.S. Cl.
CPC ............ *G01S 13/765* (2013.01); *A01B 59/00* (2013.01); *A01B 71/02* (2013.01); *A01B 76/00* (2013.01); *G01S 13/767* (2013.01)

(58) Field of Classification Search
CPC ......... G05D 2201/0201; G05D 1/0259; G05D 1/03; A01B 69/00–008; G01S 13/765; G01S 13/767
(Continued)

(56) References Cited

U.S. PATENT DOCUMENTS

| 7,839,270 B2* | 11/2010 | Shimura | ............... B60C 23/007 340/431 |
| 2003/0233189 A1* | 12/2003 | Hsiao | ..................... G01C 21/26 701/521 |

(Continued)

FOREIGN PATENT DOCUMENTS

| DE | 10217398 A1 | 1/2003 |
| DE | 102012202920 A1 | 8/2013 |

(Continued)

OTHER PUBLICATIONS

EP Search Report issued in counterpart application No. 17161367.2, dated Jul. 11, 2017 (6 pages).

(Continued)

*Primary Examiner* — Edward F Urban
*Assistant Examiner* — Rui M Hu
(74) *Attorney, Agent, or Firm* — Taft Stettinius & Hollister LLP; Stephen F. Rost

(57) ABSTRACT

A device for implement localization on an agricultural tractor includes a first tractor-side transponder and a second tractor-side transponder. The first tractor-side transponder includes a first transmission and reception region corresponding with a first mechanical implement interface located on the agricultural tractor, and the second tractor-side transponder includes a second transmission and reception region corresponding with a second mechanical implement interface located on the agricultural tractor. An implement-side transponder is in communication with the first and second tractor-side transponders. Each of the first and second tractor-side transponders transmits a separate position identifier to the implement-side transponder via one of the first or second transmission and reception region, and the position identifier is transmitted back to the respective first or second tractor-side transponder.

20 Claims, 1 Drawing Sheet

(51) Int. Cl.
*A01B 71/02* (2006.01)
*A01B 76/00* (2006.01)

(58) Field of Classification Search
USPC ................................................ 455/41.1–41.3
See application file for complete search history.

(56) References Cited

U.S. PATENT DOCUMENTS

| | | | | |
|---|---|---|---|---|
| 2007/0018793 | A1* | 1/2007 | Stewart | G06K 7/0008 340/10.3 |
| 2009/0102626 | A1* | 4/2009 | Lesesky | B60R 16/0315 340/431 |
| 2009/0143923 | A1* | 6/2009 | Breed | G08G 1/205 701/1 |
| 2010/0030490 | A1* | 2/2010 | Wright | F16D 66/02 702/34 |
| 2012/0253594 | A1* | 10/2012 | Schreiber | G05G 9/047 701/36 |
| 2012/0264373 | A1* | 10/2012 | Thevenon | G06K 7/0008 455/41.1 |
| 2013/0041524 | A1* | 2/2013 | Brey | G07C 5/08 701/2 |
| 2013/0120119 | A1* | 5/2013 | Calvarese | G06K 7/10217 340/10.5 |
| 2014/0277675 | A1* | 9/2014 | Anderson | G05B 15/02 700/114 |
| 2015/0105965 | A1* | 4/2015 | Blackwell | A01B 59/002 701/28 |
| 2015/0264866 | A1* | 9/2015 | Foster | A01B 69/004 414/21 |
| 2016/0264387 | A1* | 9/2016 | Yoon | B66F 9/08 |
| 2016/0379430 | A1* | 12/2016 | Kimura | G08C 17/02 340/5.61 |
| 2017/0217444 | A1* | 8/2017 | Chaston | B60W 50/08 |

FOREIGN PATENT DOCUMENTS

| | | |
|---|---|---|
| EP | 2018981 A1 | 1/2009 |
| EP | 2290588 A2 | 3/2011 |

OTHER PUBLICATIONS

German Search Report in foreign counterpart application No. 102016204467.2 dated Oct. 28, 2016 (7 pages).

\* cited by examiner

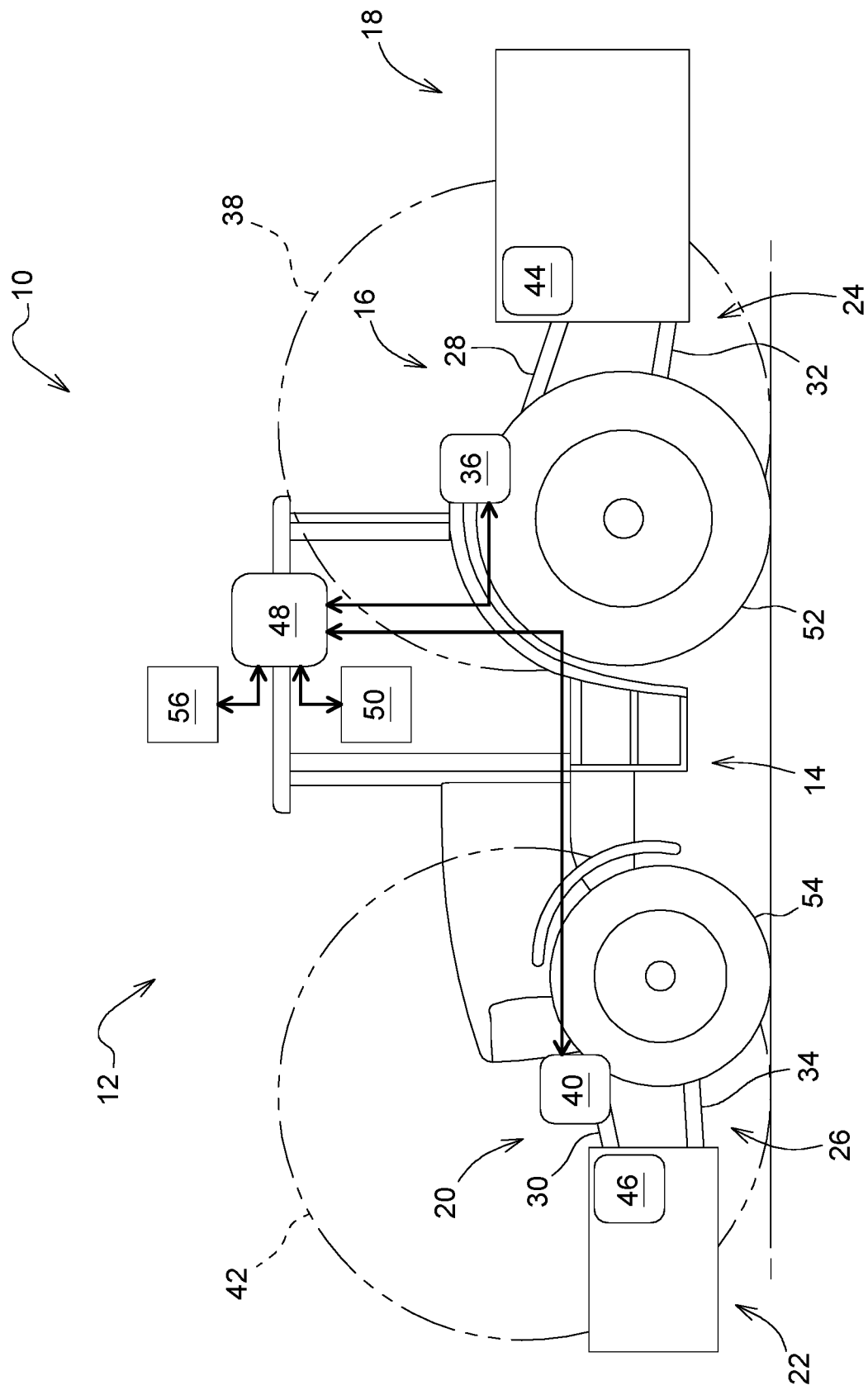

DEVICE FOR IMPLEMENT LOCALIZATION ON AN AGRICULTURAL TRACTOR

RELATED APPLICATIONS

This application claims the benefit of German Application Ser. No. 102016204467.2, filed on Mar. 17, 2016, the disclosure of which is hereby expressly incorporated by reference in its entirety.

FIELD OF THE DISCLOSURE

The present disclosure relates to a work machine or tractor, and in particular to a device for implement localization on an agricultural tractor.

BACKGROUND

In a conventional setting, an electronic agricultural implement type plate in the form of an RFID identifier contains, among other things, information about the implement type. The RFID identifier can be read by an RFID reader device about an agricultural tractor and can be used for resetting associated operating functions of the agricultural tractor. Detecting the RFID identifier can ultimately allow deduction of the presence of an agricultural implement attached to the agricultural tractor, but it is not clear whether the implement is in a front area or a rear area thereof, because most agricultural tractors have a corresponding mechanical attachment interface in both areas. This situation is particularly important for agricultural implements that can be attached either in the front area or in the rear area of the agricultural tractor, because the presetting generally has to be done differently. Such implements include counterweights, fertilizer spreaders, rotary harrows, mulchers, mowers, or soil compactors.

Thus, there is a need for a device including an improved implement localization on an agricultural tractor.

SUMMARY

In one embodiment of the present disclosure, a device for implement localization on an agricultural tractor includes a first tractor-side transponder which has a first transmission and reception region associated with a first mechanical implement interface of the agricultural tractor, and a second tractor-side transponder which has a second transmission and reception region associated with a second mechanical implement interface of the agricultural tractor. In this embodiment, each of the two tractor-side transponders transmits a separate position ID which is received by an implement-side transponder entering one of the two transmission and reception regions and is transmitted back to the transmitting tractor-side transponder.

Based on the position ID (the abbreviation "ID" stands for "identifier") transmitted in return, it is possible to determine directly which of the two mechanical implement interfaces is connected to the agricultural implement. The received position ID is transmitted for this purpose by the tractor-side transponder in question to a control unit of the agricultural tractor for further processing.

The tractor-side transponders may be located in the area of the rear and front power lifts formed as three-point implement hitches and can be integrated there into an associated hydraulic control valve block. The implement-side transponder in this case is housed in a region facing the rear or front power lift, for example, on an associated coupling frame of the agricultural implement.

The interfaces may be any other type of mechanical implement interfaces (possibly provided additionally), such as a drawbar, a coupling jaw or the like provided in the rear area of the agricultural tractor. In that respect, the use of the device is not limited to a specific coupling type.

The implement-side transponder supplements the return transmission of the position ID with implement-specific data. This implement-specific data can be an implement identifier that can be used for appropriate driver-independent presetting of various operating devices of the agricultural tractor. For example, the implement-specific data can be information regarding the weight of, or the work functions that can be performed by, the agricultural implement in question. In this case, the operating devices of the agricultural tractor can be configured by opening a control menu associated with the work functions on a graphic user interface of the agricultural tractor or by controlling a tire-filling pressure adapted to the implement weight in the associated tractor tires by means of a central tire-pressure regulation system.

The implement-side transponder can be battery-operated and therefore structurally autonomous so that subsequent attachment to older agricultural implements is also possible.

In order to avoid erroneous localization of the agricultural implement, the field strength of the tractor-site transponders is dimensioned such that overlaps of the two transmission and reception regions are out of the question. This allows unambiguous correlation between the transmission and reception region in question and the respective mechanical implement interface.

There is also the possibility that the transponders operate with Bluetooth protocol according to IEEE 802.15.1. The transponder modules to be used may be common standard parts which allow a cost-effective implementation of the device.

To save electrical energy, the implement-side transponder can be put into standby mode until it enters the transmission and reception region of one of the two tractor-side transponders. In other words, the implement-side transponder is only alerted if the agricultural implement is attached to one of the two mechanical implement interfaces of the agricultural tractor. This is particularly advantageous in relation to a possible battery operation of the implement-side transponder.

To improve interference immunity, it is possible for each of the tractor-side transponders to establish a temporal coincidence between transmitted and received position IDs. This can be done by specifying a time window opened upon transmission of the position ID, within which the position ID is transmitted back. A position ID received outside the time window will accordingly be ignored by the tractor-side transponders.

It is additionally possible for each of the tractor-side transponders to produce a tractor-specific position ID, in particular an ID derived from the serial number of the agricultural tractor. Interference due to agricultural tractors in the vicinity or passing by that are likewise equipped with the device can be securely excluded in this manner.

BRIEF DESCRIPTION OF THE DRAWINGS

The above-mentioned aspects of the present disclosure and the manner of obtaining them will become more apparent and the disclosure itself will be better understood by reference to the following description of the embodiments of the disclosure, taken in conjunction with the accompanying drawings, wherein:

The FIGURE is a schematic diagram of an embodiment of a device for implement localization on a work vehicle.

DETAILED DESCRIPTION

In a first embodiment of this disclosure, the FIGURE illustrates a device 10 as a component of a vehicle combination 12 that consists of an agricultural tractor 14 and a first agricultural implement 18 attached at a first mechanical implement interface 16, as well as a second agricultural implement 22 attached at a second mechanical implement interface 20.

The FIGURE is only one example and thus it is also possible for an agricultural implement 18, 22 to be present at only one of the two mechanical implement interfaces 16, 20.

In the present embodiment, the two mechanical implement interfaces 16, 20 are respectively conventional rear or front power lifts 24, 26, each implemented as a three-point implement hitch. Each hitch includes a pivotably mounted central upper link 28, 30 and two lower links 32, 34, one of which is mounted on each side of a differential casing or a front power takeoff casing and can be raised or lowered by means of hydraulic lifting cylinders via intermediate lifting spindles. Due to the selected graphical representation, only the front lower link of the two lower links is visible in the FIGURE. Each of the upper and lower links 28, 30, 32, 34 has at the free end thereof a catch hook, from which a coupling ball including a coupling frame of the agricultural implement 18, 22 can be suspended.

The device 10 further includes a first tractor-side transponder 36 which has a first transmission and reception region 38 associated with the first mechanical implement interface 16 and the rear power lift 24, and a second tractor-side transponder 40 which has a second transmission and reception region 42 associated with the second mechanical implement interface 20 and the front power lift 26. The tractor-side transponders 36, 40 are integrated into a control valve block, which includes the rear and front power lifts 24, 26 and to which associated hydraulic supply lines for the agricultural implement 18, 22 can be coupled.

A first implement-side transponder 44 and a second implement-side transponder 46 are also present. The implement-side transponders 44, 46 are housed in an area facing the rear or front power lift 24, 26, for example, on an associated coupling frame of the agricultural implement 18, 22. The implement-side transponders 44, 46 are battery-operated and thus structurally autonomous.

The transponders 36, 40, 44, 46 can operate with the Bluetooth protocol according to IEEE 802.15.1.

The field strength of the tractor-side transponders 36, 40 is dimensioned such that overlaps of the two transmission and reception regions 38, 42 are excluded.

Each of the two tractor-side transponders 36, 40 transmits its own position ID in the form of a corresponding data package which, when attached to an agricultural implement 18, 22, is received by the entrance of implement-side transponders 44, 46 into the respective transmission and reception regions 38, 42 and is transmitted back to the transmitting tractor-side transponder 36, 40.

Based on the return-transmitted position ID, it is possible to determine directly which of the two mechanical implement interfaces 16, 20 is connected to the agricultural implement 18, 22. The received position ID is transmitted for this purpose by the tractor-side transponder 36, 40 to a control unit 48 of the agricultural tractor 14 for further processing.

The implement-side transponder 44, 46 supplements the return transmission of the position ID with implement-specific data, which is derived from an implement identifier stored in a memory of the implement-side transponder 44, 46. The co-transmitted implement-specific data is used by the control unit 48 for driver-independent pre-adjustment of various operating devices of the agricultural tractor 14. For example, the implement-specific data can be information regarding the weight of, or the work functions that can be performed by, the agricultural implement 18, 22 in question. In this case, the operating devices of the agricultural tractor 14 are configured by opening a control menu associated with the work functions on a graphic user interface 50 of the agricultural tractor 14 or by controlling a tire-filling pressure adapted to the implement weight in the associated tractor tires 52, 54 by means of a central tire-pressure regulation system 56.

To save electrical energy, the implement-side transponder 44, 46 is put into standby mode until it enters the transmission and reception region 38, 42 of the tractor-side transponder 36, 40. In other words, the implement-side transponder 44, 46 is only awakened or alerted if the agricultural implement 18, 22 is actually attached to the agricultural tractor 14.

To improve immunity to interference, the tractor-side transponder 36, 40 establishes a temporal coincidence between transmitted and received position IDs. This is done by specifying a time window opened upon transmission of the position ID, within which the position ID must be transmitted back. A position ID received outside the time window will accordingly be ignored by the tractor-side transponder 36, 40.

The tractor-side transponder 36, 40 generates a tractor-specific position ID, more precisely an ID derived from a serial number of the agricultural tractor 14. Interference due to agricultural tractors in the vicinity or passing by that are likewise equipped with the device according to the disclosure can be securely excluded in this manner.

While embodiments incorporating the principles of the present disclosure have been described hereinabove, the present disclosure is not limited to the described embodiments. Instead, this application is intended to cover any variations, uses, or adaptations of the disclosure using its general principles. Further, this application is intended to cover such departures from the present disclosure as come within known or customary practice in the art to which this disclosure pertains and which fall within the limits of the appended claims.

The invention claimed is:

1. A device for implement localization on an agricultural tractor, comprising:
   a first tractor-side transponder including a first transmission and reception region corresponding with a first mechanical implement interface located on the agricultural tractor;
   a second tractor-side transponder including a second transmission and reception region corresponding with a second mechanical implement interface located on the agricultural tractor;
   an implement-side transponder in communication with the first and second tractor-side transponders;
   wherein, each of the first and second tractor-side transponders transmits a separate position identifier (ID) to the implement-side transponder via one of the first or second transmission and reception region;

wherein, the position ID is transmitted back to the respective first or second tractor-side transponder and the implement-side transponder transmits implement-specific data to the respective first or second tractor-side transponder; and wherein, driver-independent pre-adjustment of various devices of the agricultural tractor is performed based on the implement-specific data.

2. The device of claim 1, wherein the implement-side transponder transmits implement-specific data with the position ID to the respective first or second tractor-side transponder.

3. The device of claim 1, wherein the implement-side transponder is battery-operated.

4. A device for implement localization on an agricultural tractor, comprising:
  a first tractor-side transponder including a first transmission and reception region corresponding with a first mechanical implement interface located on the agricultural tractor;
  a second tractor-side transponder including a second transmission and reception region corresponding with a second mechanical implement interface located on the agricultural tractor;
  a first implement-side transponder positioned in the first transmission and reception region of the first tractor-side transponder to enable communication between the first implement-side transponder and the first tractor-side transponder; and
  a second implement-side transponder positioned in the second transmission and reception region of the second tractor-side transponder to enable communication between the second implement-side transponder and the second tractor-side transponder;
  wherein each of the first and second tractor-side transponders transmits a separate position identifier (ID) to the corresponding first or second implement-side transponder via one of the first or second transmission and reception region, the position ID is transmitted back to the respective first or second tractor-side transponder, and a field strength of the first and second tractor-side transponders is dimensioned such that overlaps of the first and second transmission and reception regions are excluded.

5. The device of claim 1, wherein each transponder operably communicates via Bluetooth protocol.

6. The device of claim 1, wherein the implement-side transponder is operably controlled in a standby mode until it enters the transmission and reception region of the first or second tractor-side transponder.

7. The device of claim 1, wherein each of the first and second tractor-side transponders establishes a temporal coincidence between transmitted and received position IDs.

8. The device of claim 1, wherein each of the first and second tractor-side transponders produces a tractor-specific position ID.

9. A work vehicle system, comprising:
  an agricultural tractor;
  an implement coupled to the tractor; and
  a device for implement localization on the agricultural tractor, the device including:
    a first tractor-side transponder including a first transmission and reception region corresponding with a first mechanical implement interface located on the agricultural tractor;
    a second tractor-side transponder including a second transmission and reception region corresponding with a second mechanical implement interface located on the agricultural tractor;
    an implement-side transponder in communication with the first and second tractor-side transponders;
    wherein, each of the first and second tractor-side transponders transmits a separate position identifier (ID) to the implement-side transponder via one of the first or second transmission and reception region;
    wherein, the position ID is transmitted back to the respective first or second tractor-side transponder and the implement-side transponder transmits implement-specific data separate from, and supplementary to, the position ID to the respective first or second tractor-side transponder; and
    wherein driver-independent pre-adjustment of various devices of the agricultural tractor is performed based on the implement-specific data.

10. The work vehicle system of claim 9, wherein the implement-side transponder is battery-operated.

11. The work vehicle system of claim 9, wherein a field strength of the first and second tractor-side transponders is dimensioned such that overlaps of the first and second transmission and reception regions are excluded.

12. The work vehicle system of claim 9, wherein each transponder operably communicates via Bluetooth protocol.

13. The work vehicle system of claim 9, wherein the implement-side transponder is operably controlled in a standby mode until it enters the transmission and reception region of the first or second tractor-side transponder.

14. The work vehicle system of claim 9, wherein each of the first and second tractor-side transponders establishes a temporal coincidence between transmitted and received position IDs.

15. The work vehicle system of claim 9, wherein each of the first and second tractor-side transponders produces a tractor-specific position ID.

16. The work vehicle system of claim 15, wherein the tractor-specific position ID is derived from a serial number of the agricultural tractor.

17. The work vehicle system of claim 9, wherein the device includes a second implement-side transponder in communication with at least one of the first and second tractor-side transponders.

18. The work vehicle system of claim 17, wherein:
  at least one of the first and second tractor-side transponders transmits a separate position identifier (ID) to the second implement-side transponder via one of the first or second transmission and reception regions; and
  the position ID is transmitted back to at least one of the first and second tractor-side transponders by the second implement-side transponder and the second implement-side transponder transmits implement-specific data separate from, and supplementary to, the position ID to at least one of the first and second tractor-side transponders.

19. The work vehicle system of claim 18, wherein the second implement-side transponder is battery-operated.

20. The work vehicle system of claim 18, further comprising a control unit, wherein the control unit is operable to perform the driver-independent pre-adjustment of various devices of the agricultural tractor based on the implement-specific data transmitted by at least one of the first and second implement-side transponders.

* * * * *